T. C. SHEPHERD, Jr.
VEHICLE WHEEL.
APPLICATION FILED SEPT. 5, 1914.
1,164,554.
Patented Dec. 14, 1915.
3 SHEETS—SHEET 1.
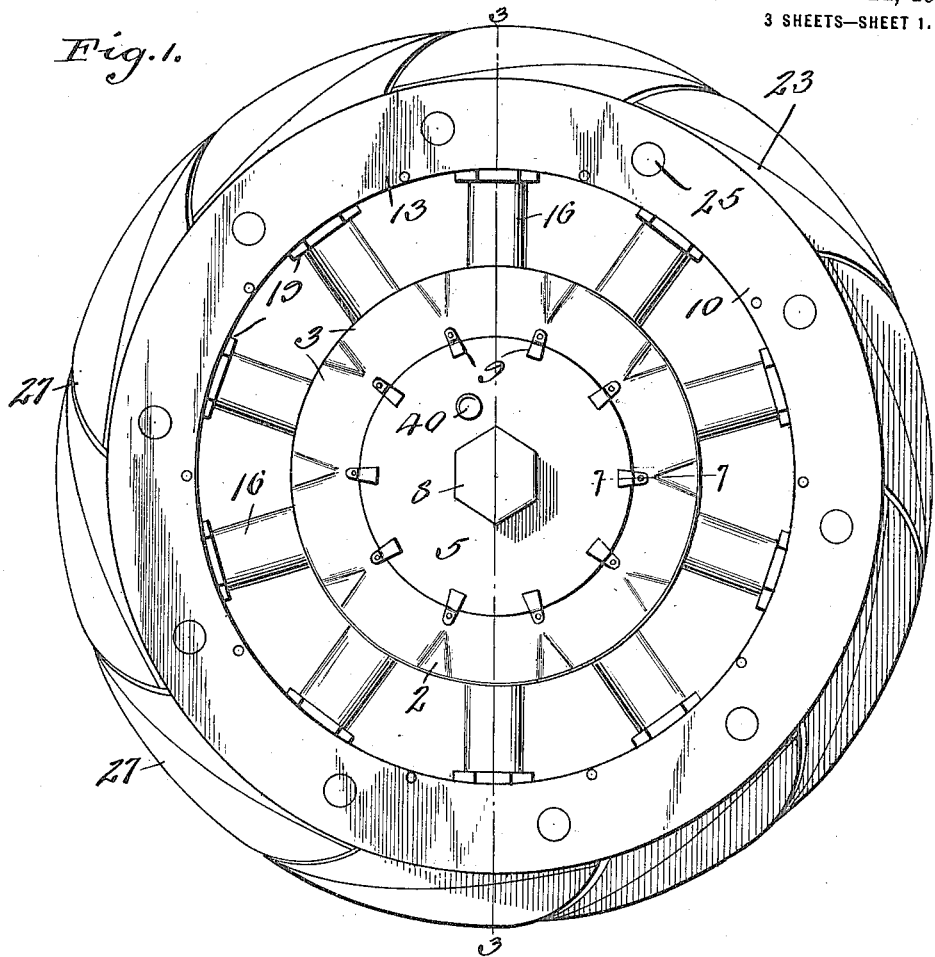
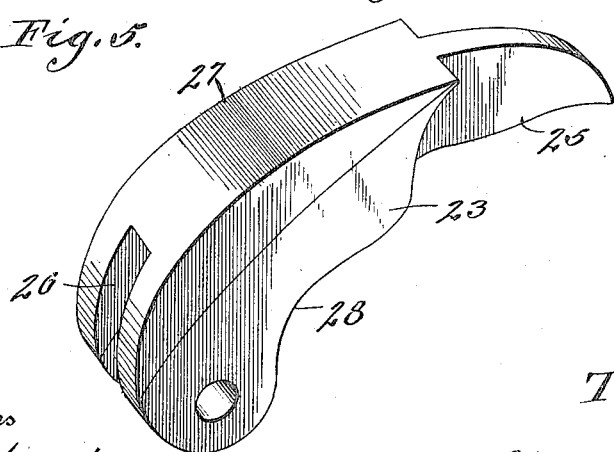
Inventor
T. C. Shepherd, Jr.
Witnesses
By Victor J. Evans
Attorney

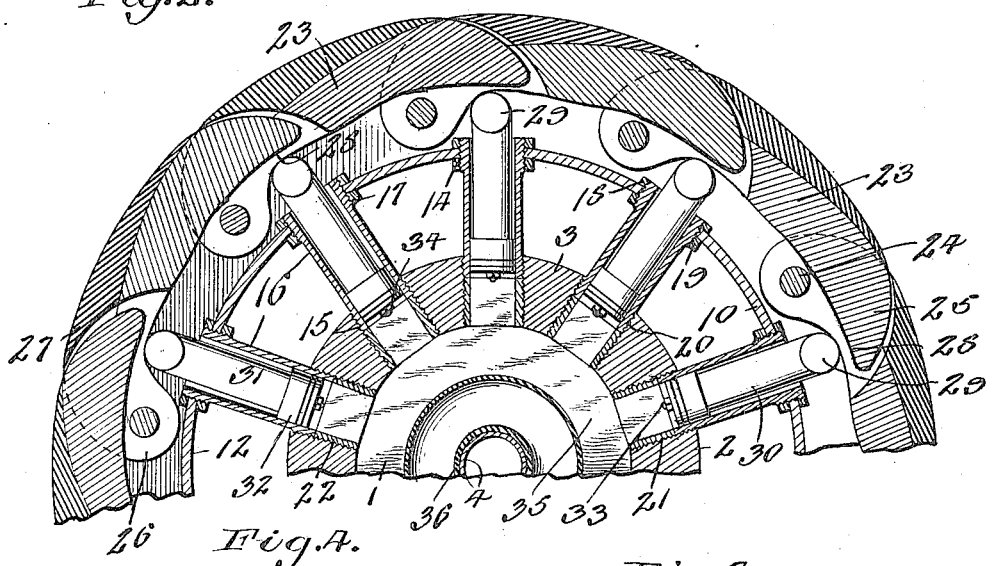
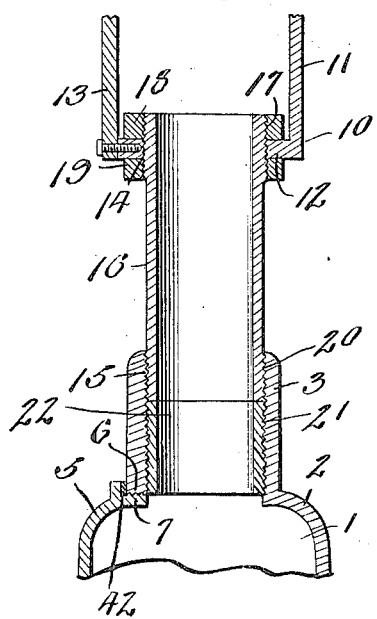
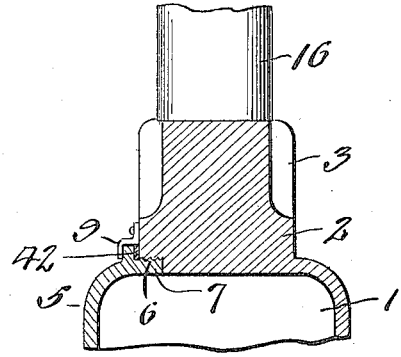

T. C. SHEPHERD, Jr.
VEHICLE WHEEL.
APPLICATION FILED SEPT. 5, 1914.
1,164,554.
Patented Dec. 14, 1915.
3 SHEETS—SHEET 3.
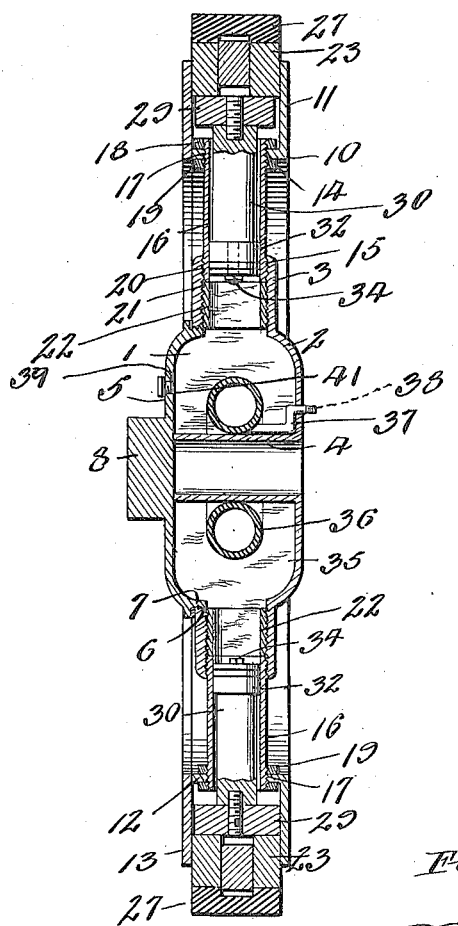
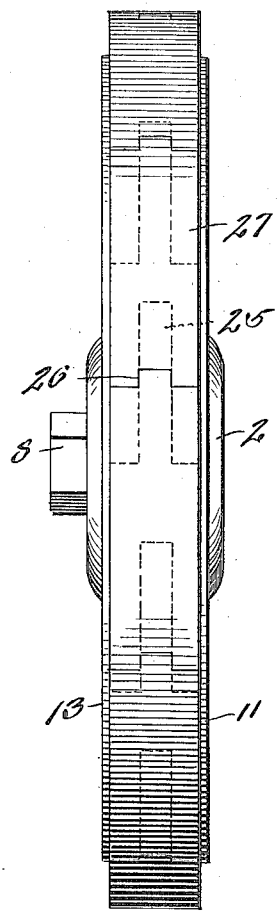
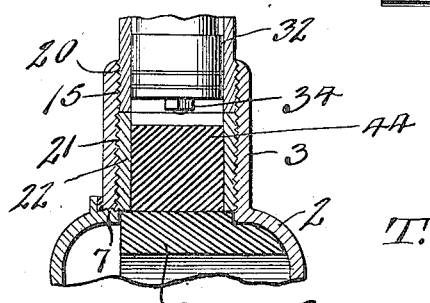

UNITED STATES PATENT OFFICE.

THOMAS CLIFTON SHEPHERD, JR., OF JOLIET, ILLINOIS.

VEHICLE-WHEEL.

1,164,554.  Specification of Letters Patent.  Patented Dec. 14, 1915.

Application filed September 5, 1914. Serial No. 860,410.

*To all whom it may concern:*

Be it known that I, THOMAS CLIFTON SHEPHERD, Jr., a citizen of the United States, residing at Joliet, in the county of Will and State of Illinois, have invented new and useful Improvements in Vehicle-Wheels, of which the following is a specification.

This invention relates to vehicle wheels; and it has for its primary object the provision of a wheel of this character which may be used upon vehicles as a substitute for the well known form of pneumatic wheel or wheels employing a cushioning inflatable tire, one which will possess a maximum degree of elasticity, one which will be puncture-proof, cheap, strong and durable, and one wherein the cost of up keep or maintenance of the wheel will be considerably reduced.

Another object of the invention is the provision of a wheel of this character which will include an inner cushioning chamber and outer independent tread sections having portions operating in the chamber and adapted to be cushioned as the tread sections are moved radially with respect to the axis of the wheel under the application of shocks or load thereto.

A further object of the invention is the provision of a wheel of this character wherein the cushioning chamber is designed to contain a buoyant agent such as glycerin, oil, water or a like fluid and means located within the chamber to compensate for the displacement of the fluid about the chamber under the application of pressure against the fluid through working operations of the tread sections of the wheel.

A still further object of the invention is the provision of a wheel of this character which will include a rim and tread sections that are constructed with regard to each other so as to prevent an undesirable accumulation of foreign matter or snow beneath the tread sections and in the channel of the rim.

A still further object of the invention is the provision of a wheel wherein the parts thereof are separable from one another whereby any particular worn part may be removed when desired and a new part substituted at a minimum cost.

With these and other objects in view, the invention consists of certain novel features of construction, combination and arrangement of parts, as will be hereinafter described and claimed.

In the accompanying drawings:—Figure 1 is a side elevational view of the wheel; Fig. 2 is a longitudinal section therethrough; Fig. 3 is a section on line 3—3 of Fig. 1; Fig. 4 is a section on an enlarged scale through a portion of a wheel, showing the manner of connecting the piston cylinder on the spoke guiding cylinder with the fluid chamber and with the rim; Fig. 5 is a perspective view of one of the tread sections; Fig. 6 is an edge view of the wheel; Fig. 7 is a section on line 7—7 of Fig. 1; and Fig. 8 is a section through a portion of the wheel, showing a slightly modified form thereof.

The wheel comprises an inner fluid chamber or cushioning chamber 1, which is defined by a member 2 having an outer annulus 3, a hub sleeve or box 4 and a member 5. The annulus 3 is provided with a threaded passage 6 which receives a correspondingly threaded portion 7 of the member 5. The member 5 is provided with an integral nut or wrench engaging portion 8 whereby said member 5 may be connected with or disconnected from the member 2, as the occasion may demand. In order to prevent the member 5 from becoming accidentally disconnected from the member 2, I provide the annulus 3 with a plurality of adjustable clamping devices 9 that are adapted to be adjusted over the member 5, as shown in Fig. 7.

Concentric with the annulus 3 and spaced therefrom is a channeled rim 10 substantially of U-form in transverse section and provided with a fixed side flange 11, a base flange 12, and a removable side flange 13. At this time it is said, however, that this particular construction of the rim is not essential to an operative collection or arrangement of the parts of the wheel to be subsequently referred to and I desire it to be known that any well known obvious form of rim may be substituted in lieu of the one described. The base 12 of the rim is provided with a plurality of threaded radial passages 14, which are alined with similar threaded radial passages 15 in the annulus 3. Hollow tubular spokes 16 have their outer ends extended through the passages 14, and as shown said spokes are threaded at said outer ends, as at 17, to receive companion clamping nuts 18 and 19 that are engaged respectively against the opposite surfaces of the flange 12 of the rim. The inner ends of the spokes are threaded at 20 for connection in the outer threads of the passages 15 formed in the annulus. The remaining threads of the passage 15 receive corresponding threads 21 on steel casings or tubes 22, which are employed for a purpose to be hereinafter described. This construction is such that any particular spokes 15 or casing 22 may be removed at the convenience of the operator and replaced by new parts at a small cost.

Arcuate tread sections 23 are pivoted at 24 in the side flanges 11 and 13 of the rim. These sections are equal in number with the spokes and as illustrated their pivotal points are disposed slightly to the sides of the spokes for a purpose to be hereinafter explained. Each tread section is preferably provided at one end with a reduced tongue or extension 25 which extends between spaced portions 26 of an adjacent tread section, as shown in Figs. 1 and 2. In this manner a substantially uninterrupted surface is formed by all of the tread sections. The outer surfaces of the tread section are provided with rubber facing blocks 27. In line with the spokes the tread sections are provided with tongues 28. Bearing upon the under surface of each tread section as shown at 29 are piston rods 30. These rods are provided with stems 31, equipped with piston heads 32 that are slidable in said casings. The stems 31 are threaded at 33 to receive clamping nuts 34, which are designed to hold the heads in applied positions upon the rods 30.

In order that the tread sections are rendered freely yieldable to shocks and jars that may be applied thereto, I supply the chamber 1 of the wheel with a liquid 35 in the nature of glycerin, oil, water or the like. The cylinders 22 in which the pistons are designed to reciprocate open directly into the chamber 1, and, as a consequence, said pistons will be adapted to work against the liquid as the tread sections are moved radially under the application of load or shocks and jars to the wheel. To maximize the buoyant or elastic qualities of the fluid and to compensate for the displacement of the fluid as the tread sections of the wheel are actuated and the pistons reciprocated, I provide the chamber 1 with an expansible member 36 which may be in the form of an endless rubber tube embracing the hub sleeve or box 4 and provided with an inflating tube 37 which extends to the member 2 and which is provided with an inwardly opening check valve 38. The member 5 of the wheel is provided with a filling opening 39 in which is removably connected a cap or plug 40.

Initially the wheel is laid upon one side with the side 5 arranged uppermost. The cap 40 is removed from the filling opening 34 and fluid is then introduced to the chamber 1 and the air displaced from said chamber through said filling opening and when the chamber is approximately filled the cap 39 is applied so as to prevent the escape of the fluid. After this operation, air is supplied to the expansible member 36 so as to effect an initial displacement or equal distribution of the fluid to all parts of the chamber. In this manner the respective pistons will be uniformly supported by the fluid. In order to prevent accidental escape of the fluid from the side of the chamber 1, I provide the cap or plug 40 with a suitable elastic gasket 41 interposed between the member 4 and the plug. In addition thereto the member 5 is provided with a similar gasket 42, which is adapted to bear against the annulus 3.

Within the inner ends of the cylinders 22 are fitted rings 43, as shown in Fig. 8. In the event that the fluid is lost from the chamber 1, elastic cylindrical bodies 44 may be inserted in the cylinders 32 and held therein by said rings 43. The pistons are then adapted to operate against said cushioning blocks in lieu of the fluid.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

I claim:—

A vehicle wheel comprising a series of tread sections each pivoted to the rim of the wheel at one extremity and having its free extremity movably mounted in an adjacent section, air cushioned slidable spokes, each of said spokes contacting with the under surface of its associated tread section and underlying the free extremity of an adjacent tread section.

In testimony whereof I affix my signature in presence of two witnesses.

THOMAS CLIFTON SHEPHERD, JR.

Witnesses:
WALTER W. WOLLFEL,
FRED E. WHALLON.

Copies of this patent may be obtained for five cents each, by addressing the "Commissioner of Patents, Washington, D. C."